US010897187B2

(12) United States Patent
Rothe et al.

(10) Patent No.: US 10,897,187 B2
(45) Date of Patent: Jan. 19, 2021

(54) METHOD FOR CONTROLLING A MOVEMENT, A CONTROL DEVICE, A LINEAR DRIVE, A PRODUCTION MACHINE, A PACKAGING MACHINE AND A COMPUTER PROGRAM PRODUCT (71) Applicant: Siemens Aktiengesellschaft, Munich (DE)

(72) Inventors: Sven Rothe, Tabarz (DE); Chris Hofmann, Stuttgart (DE); Marco Gierden, Weisendorf (DE); Thomas Hennefelder, Markt Sugenheim (DE); Michael Jaentsch, Princeton, NJ (US); Carsten Spindler, Remptendorf (DE)

(73) Assignee: Siemens Aktiengesellschaft, Munich (DE)

( * ) Notice: Subject to any disclaimer, the term of this patent is extended or adjusted under 35 U.S.C. 154(b) by 65 days.

(21) Appl. No.: 15/778,157

(22) PCT Filed: Nov. 14, 2016

(86) PCT No.: PCT/EP2016/077547
§ 371 (c)(1),
(2) Date: May 22, 2018

(87) PCT Pub. No.: WO2017/089154
PCT Pub. Date: Jun. 1, 2017

(65) Prior Publication Data
US 2019/0002206 A1    Jan. 3, 2019

(30) Foreign Application Priority Data

Nov. 24, 2015 (EP) .................................... 15196041
Nov. 24, 2015 (EP) .................................... 15196047
(Continued)

(51) Int. Cl.
H02K 41/02      (2006.01)
H02P 25/06      (2016.01)
(Continued)

(52) U.S. Cl.
CPC ............. *H02K 41/02* (2013.01); *B23Q 15/24* (2013.01); *B65G 37/00* (2013.01); *B65G 37/005* (2013.01);
(Continued)

(58) Field of Classification Search
CPC ...................................................... H02K 41/02
See application file for complete search history.

(56) References Cited

U.S. PATENT DOCUMENTS 6,191,507 B1 * 2/2001 Peltier .................... B65G 54/02
                                                              310/12.02
6,803,681 B2 10/2004 Faizullabhoy et al.
(Continued)

FOREIGN PATENT DOCUMENTS

CN    101676101    3/2010
CN    104176465    12/2014
(Continued)

OTHER PUBLICATIONS

Office Action dated Jun. 3, 2020 issued in Chinese Patent Application No. 201680068464.3.
(Continued)

*Primary Examiner* — Thomas Randazzo
(74) *Attorney, Agent, or Firm* — Cozen O'Connor (57) ABSTRACT A control device, linear drive, production- or packaging machine, computer program product and method for controlling movement of at least one rotor in the linear drive, wherein a user or a machine station specifies the movement pattern to the control device to specify the movement, where the specified movement pattern is associated with virtual
(Continued)

axes, particularly via the computer program product, the movement pattern is advantageously automatically associated with virtual axes subsequently associated with real axes, a control unit, i.e., a converter, controls movement of the rotor on the segment of the linear drive and the control unit supplies at least one segment with electrical voltage or current, where the segments as part of the linear drive therefore move the rotors in accordance with the specifications of the movement pattern, where such an association occurs automatically, and the user is relieved of this task during specification of the movement pattern.

17 Claims, 7 Drawing Sheets

(30) Foreign Application Priority Data

| | | | |
|---|---|---|---|
| Nov. 24, 2015 | (EP) | ..................................... | 15196077 |
| Mar. 21, 2016 | (EP) | ..................................... | 16161433 |
| Mar. 21, 2016 | (EP) | ..................................... | 16161436 |
| Mar. 21, 2016 | (EP) | ..................................... | 16161437 |

(51) Int. Cl.

| | |
|---|---|
| *B65G 37/00* | (2006.01) |
| *B65G 23/23* | (2006.01) |
| *B65G 43/10* | (2006.01) |
| *B65G 54/02* | (2006.01) |
| *G05B 19/19* | (2006.01) |
| *B23Q 15/24* | (2006.01) |

(52) U.S. Cl.
CPC .............. *B65G 43/10* (2013.01); *B65G 54/02* (2013.01); *G05B 19/19* (2013.01); *H02P 25/06* (2013.01); *B65G 23/23* (2013.01); *G05B 2219/41327* (2013.01); *G05B 2219/41337* (2013.01); *G05B 2219/50229* (2013.01); *Y02P 90/02* (2015.11)

(56) References Cited

U.S. PATENT DOCUMENTS

| | | | |
|---|---|---|---|
| 8,382,106 B2 | 2/2013 | Noell | |
| 8,973,768 B1* | 3/2015 | Jung | B66C 9/16 |
| | | | 212/312 |
| 9,628,013 B2 | 4/2017 | Boenke et al. | |
| 2010/0064916 A1* | 3/2010 | Noll | B41F 13/0045 |
| | | | 101/217 |
| 2010/0185320 A1* | 7/2010 | Nemeth-Csoka | B23Q 17/22 |
| | | | 700/230 |
| 2011/0237386 A1* | 9/2011 | Hirtt | G05B 19/404 |
| | | | 477/3 |
| 2012/0247925 A1* | 10/2012 | Cooke | B65G 43/00 |
| | | | 198/617 |
| 2013/0264902 A1* | 10/2013 | Wilson | H02K 7/06 |
| | | | 310/80 |
| 2014/0350719 A1 | 11/2014 | Fleischmann et al. | |
| 2015/0251853 A1 | 9/2015 | Ragan et al. | |
| 2016/0139585 A1* | 5/2016 | Hessenauer | G05B 19/19 |
| | | | 700/275 |
| 2016/0141992 A1* | 5/2016 | Boenke | H02P 21/05 |
| | | | 318/135 |
| 2016/0167899 A1* | 6/2016 | Prinz | G01N 35/02 |
| | | | 198/339.1 |
| 2016/0190966 A1* | 6/2016 | Kadynski | H02P 25/064 |
| | | | 318/135 |

FOREIGN PATENT DOCUMENTS

| | | | |
|---|---|---|---|
| CN | 104718143 | 6/2015 | |
| DE | 10150319 C1 * | 5/2003 | .............. B23Q 5/28 |
| DE | 102008008602 | 12/2008 | |
| EP | 2141019 | 1/2010 | |
| EP | 3024128 | 5/2016 | |
| EP | 3024137 | 5/2016 | |
| WO | WO2017/089182 | 6/2017 | |

OTHER PUBLICATIONS

PCT International Search Report and Written Opinion of International Searching Authority dated Jul. 3, 2017 corresponding to PCT International Application No. PCT/EP2016/077547 filed Nov. 14, 2016.

* cited by examiner

METHOD FOR CONTROLLING A MOVEMENT, A CONTROL DEVICE, A LINEAR DRIVE, A PRODUCTION MACHINE, A PACKAGING MACHINE AND A COMPUTER PROGRAM PRODUCT

CROSS-REFERENCE TO RELATED APPLICATIONS

This is a U.S. national stage of application No. PCT/EP2016/077547 filed Nov. 14, 2016. Priority is claimed on EP Application No. EP15196047 filed Nov. 24, 2015, EP Application No. EP15196041 filed Nov. 24, 2015, EP Application No. EP15196077 filed Nov. 24, 2015, EP Application No. EP16161436 filed Mar. 21, 2016, Application No. EP16161437 filed Mar. 21, 2016, and EP Application No. EP16161433 filed Mar. 21, 2016, the content of which are incorporated herein by reference in their entirety.

BACKGROUND OF THE INVENTION

1. Field of the Invention

The invention relates to a method for controlling a movement and a control device, a linear drive, a packaging machine, a production machine and a computer program product.

2. Description of the Related Art

Transport systems, in particular linear drives, are widely used nowadays in the production and packaging as well as for transportation of goods. Today, modern transport systems have areas that encompass a number of sequentially arranged stators of linear motors. With a linear drive, a plurality of stators of linear motors are often arranged adjacently to each other. The stators may also be called segments. In other words, linear drives comprise sequentially arranged segments. Each of the segments may be controlled and/or supplied with current/voltage from a control unit comprising a current amplifier or a current converter. The segments serve to move rotors that are positioned on the segments.

In conventional linear drives, the rotors serve to transport the goods. The goods are, as a rule, transported to machine stations or transported away from machine stations.

DE 10 2008 008 602 A1 discloses a system, in which each section has a frequency converter and the associated converter control assigned to it. The control devices assigned to the directly adjacent sections can communicate with each other. In particular, one control device can form the master and the other control device can form the slave to pass a transported element from one section to the next section.

SUMMARY OF THE INVENTION

It is the object of the invention to provide a simpler way to establish movement patterns in a transport system, in particular in a linear drive.

This and other objects and advantages are achieved in accordance with the invention by a method a packaging machine, and a machine tool or a production machine for controlling the movement of at least one rotor of a linear drive in which the linear drive comprises at least one segment and the rotor, where the method comprises at least the steps of specifying a movement pattern of the rotor, transforming the movement pattern of the rotor into a specification for a virtual axis, and transforming the specification of the virtual axis into a specification for a real axis or into a specification for a number of real axes, where the specification for the at least one real axis is provided to a control unit, and where the control unit controls the movement of the rotor on the segment via the specification.

It is also an object of the invention to provide a method for controlling and/or regulating a movement of rotors in a linear drive, where the linear drive is configured to transport goods or products in a machine station or from one machine station to a further machine station, where segments are provided for the movement of the rotors, where a control device is configured to control or regulate the movement of the rotors on the segments, and where the linear drive in the control device is configured via the following assignments in which each machine station, in particular each real machine station, is assigned a particular virtual station the respective rotor is assigned has a virtual axis, and the respective segment is assigned a real axis. The method comprises specifying a movement profile for the respective station, specifying input conditions, in particular an intended number of virtual axes for the respective station, specifying a sequence/position of real axes, and controlling or regulating the rotors of the linear drive, wherein the segments are regulated via specifications of the real axes, where the real axes are ascertained from the respective virtual axis, and where the respective virtual axis is ascertained from the respective movement profile of the station and/or the sequence of the passed-through stations.

Here the sequence of stations for a rotor may have been specified, and/or the sequence of stations results such that the virtual axis is assigned to a station when the station is ready to receive an intended number of virtual axes and the intended number of virtual axes is available to the station.

In accordance with the invention, the virtual axes, in particular in accordance with a predefined sequence, are assigned respectively one after the other to the predefined stations.

Advantageously, the movement pattern is created with the aid of a project generator or an engineering program. The movement pattern may be provided to a control unit of the linear drive. The movement pattern may also be continuously newly adapted or created by way of the operating state of the linear drive. In this case, the movement pattern is provided by the movement control as such.

The rotor may have permanent magnets on its underside. On its top side the rotor advantageously comprises fixing structure for a workpiece or a commodity. The position of the rotor on the segment is changed by a magnetic field (or an electrical field). The segment may also be configured as a stator of a Symplex linear motor-stator.

The segment comprises coils. The segment may be constructed analogously to a stator of a linear motor. The coils are used for the purpose of generating a magnetic field using the current from the control unit.

The linear drive, in particular the rotors on the segments, is configured to transport goods or workpieces from one place to another. Advantageously, a linear drive is used to transport workpieces or goods from one machine station to another machine station.

The invention can, for example, be used in a bottling plant, a processing machine, a packaging machine, a labelling machine, a packaging machine or a machine tool. The above-mentioned examples are used for modifying the workpiece or the commodity. The workpiece or the commodity is fixed on the rotor. The rotor is advantageously passed through the machine station.

The planning of processes at the machine stations requires a supply and a discharge for the workpieces or goods according to a timing schedule. The movement of the rotors on the segments is described by a movement pattern.

Advantageously, the linear drive feeds a workpiece or a commodity, in particular on at least one rotor, into the machines or right through the machine station. The machine station and the linear drive may be coupled such that individual segments or parts of segments are located within the range of influence of the machine station. The linear drive may be part of the respective machine station. As part of the programming of a movement pattern the machine station (i.e., virtual machine, also denoted with station) may be implemented as a station in the above-mentioned computer program product.

A machine station may specify at least a part of the movement pattern. A machine station as well as the station may have an assigned movement profile. A movement profile indicates how the one rotor or a plurality of rotors is/are moved within the machine station.

A movement pattern specifies the movement of one or more rotors on a segment or across a number of segments.

In one embodiment, a movement pattern is specified as a function of the position of a rotor in terms of time.

In one advantageous embodiment, however, a movement pattern may also be specified by positions, which one or more rotors are to assume consecutively. Optionally, marginal conditions may be specified, such as a maximum acceleration or maximum jolt of the rotors. The marginal conditions affect the ascertainment of the movement pattern of the rotors.

Alternatively, a movement pattern may also be specified by a chronological sequence of positions or speeds of one or more rotors on a segment or a plurality of segments.

A movement pattern is specified by a user and/or by a machine station. A user may specify or program a movement pattern with the aid of a graphic user interface and/or a high-level language. A suitable high-level language may be a script language. A high-level language may also be a language adapted to the problem for determining a movement pattern. A high-level language is characterized in particular by commands which, through appropriate parametrization, are suitable for specifying a movement pattern.

In an alternative embodiment, the movement pattern may likewise be specified via marginal conditions of the movement of one rotor as a function of a further rotor, with the specified movement being calculated by a software module, in particular a project generator.

The transfer of the rotors from one machine station to another machine station is performed with the aid of a handshake process.

The handshake process comprises receiving at a machine station an intended number of rotors.

Following reception, the respective received rotor is assigned an identifier/address. After reception in the machine station, the rotors are within the range of influence of the respective machine station MS1, MS2. Next, within the range of influence of the respective machine station, the rotors execute a movement as specified by the movement profile.

After the movement has been executed the machine station again releases the rotors. The rotors now leave the range of influence of the machine station.

The movement pattern may also be specified or changed during operation of the linear drive.

A virtual axis is understood to be a specified movement of a rotor on at least one segment. A virtual axis may also be defined by the movement of a rotor via the movement of a further rotor. In this example, the specification consists in the specified movement of a rotor. With respect to the movement of the rotor, a further rotor may be moved subsequently at a variable distance. A virtual axis comprises specifications for the movement of a rotor. The virtual axis may refer to the movement of a rotor across a number of segments. In other words, a virtual axis denotes the description of a rotor of the linear drive.

Transformation of a movement pattern into one or more virtual axes is effected by allocating the movement task to the rotors. An additional rotor can orient itself on a movement of an already existing rotor and/or a movement of another rotor assigned to a virtual axis. Examples for an orientation of the movement are a spaced-apart synchronous run of two rotors or one rotor trailing behind another rotor or two rotors running in opposite directions.

In an alternative embodiment, a real axis comprises the information about the movement of the rotor, where the movement of the rotor refers to a segment. A real axis may comprise specifications for absolute values of the movement, such as speeds of the rotor at certain positions or at certain times. The real axis advantageously serves to describe the movement of one or more rotors on one segment.

The virtual axis corresponds to an image of the movement of the respective rotor in the control device or in the computer program product. The real axis corresponds to the rotor on the segment, in particular the real axis corresponds to the set of commands, which is transferred to the respective segment with the aid of a control unit and/or a current converter/amplifier. In other words, a real axis may correspond to the set of commands for controlling a segment, in particular for controlling at least one rotor on the respective segment. The virtual axis to the segment or the control unit is advantageously provided by the control device. The control device may be implemented by a computer unit, and the computer program product can be installed on the computer unit. The computer program product may moreover be part of an engineering program.

The specification for the real axis is provided as a signal to the control unit. The control unit supplies a voltage or a current to a segment. The rotor is moved on the segment by way of the current/the voltage. Advantageously, a control unit serves to control the movement of a rotor on a segment.

Transforming the specification of the virtual axis into a specification for at least one real axis serves to provide a signal to the control unit. The control unit serves to control one or more segments. Transforming the specification from a virtual axis into at least one real axis may be effected by transferring or allocating the specification of a relative movement of the rotor into specifications for the control units of the individual segments.

In an alternative advantageous embodiment, the transformation may be effected by a matrix transformation. The input variable for a matrix transformation is a vector with movement specifications or virtual axes in a basis, where the basis defines the movement of at least one rotor on a number of segments. The basis has as its dimension the number of rotors. With the matrix transformation, which may be a simple matrix multiplication, the specification of the movement is transformed into another basis. The other basis has as its dimension the number of segments. The matrix transformation does not have to be linear. The matrix transformation is advantageously dependent on a position vector of the virtual axis. Thus, the matrix transformation may, at any point in time, be a linear transformation.

The control device for a linear drive comprises an input for a movement pattern of a rotor. The control device further comprises an output for a signal, where the signal is transmitted to a control unit. The signal can be provided, in accordance with the real axis, by the control device. The control device is configured to convert a specified movement pattern into signals for the control units. The control device may be implemented as a computer program. The computer program, when executed on a computer unit, is configured to convert a movement pattern into signals for the at least one control unit.

The computer program product, in particular a project generator or an engineering program, serves to execute the described method in an automated manner. The computer program product is installed on a computer unit. The computer program is loaded into a working memory of the computer unit for execution and executed from there by a processor (CPU). The movement pattern may be specified in a file or by a machine station once or repeatedly (online functionality). The computer program product provides signals to the at least one control unit, where the signals are intended for controlling the movement of the rotors of the linear drive.

In accordance with a preferred embodiment, the movement pattern is provided via a process for ascertaining a movement pattern. In the process, stations that are virtual images of specified machine stations are specified, with a movement profile being assigned to the respective station.

Further, segments and rotors are specified by, in particular, their properties. The movement of the rotors is described via input conditions and output conditions serving as parameters of the stations. Here, the stations are images of machine stations, where the respective movement profile of the station orients itself on the intended movement of the rotors in the machine station. Thus, a movement of the rotors can be specified by the machine functions analogously to a Petri network. The project generator advantageously transfers the movement pattern into the control device of the linear drive.

The linear drive comprises at least one segment, at least one rotor, at least one control unit as well as a control device. The rotor or rotors are intended for performing a specified movement on the segments. At least one segment is connected to a control unit. The at least one control unit is connected to the control device. The control device is configured to provide signals to the control unit. The control unit is intended for controlling the rotor on the segment. The segment may be assigned to a machine station.

A production machine is generally understood to be a device, which is configured for processing a workpiece or goods. Examples for a production machine are an injection molding machine, a varnishing machine or a bottling plant.

In one advantageous embodiment of the method, the virtual axis maps the movement of the rotor on one or more segments. A virtual axis corresponds to the image of a rotor in a computer program or in the control device. The mapping of the rotors onto the virtual axis is effected analogously to the mapping of a machine station onto the station. A number of virtual axes can be coupled to form one virtual axis. The virtual axis describes the movement of the rotor on the segments of the linear system independently of how the movement of the one or more rotors is allocated to the individual segments.

For example, the movement of one rotor can orient itself on the movement of another rotor, in particular across a number of segments. In this way, complex movement patterns can be specified and processed in a simple manner.

In a further advantageous embodiment of the method, the movement pattern is specified by a user. To input the movement pattern, the user can use an appropriate program with a suitable mask. The program may be configured as an engineering program, in particular as the above-described project generator.

With this arrangement, there is no need for the user to specify the movement pattern directly to the control device. Alternatively, the user may be in communication with the control device via a network, such as the Internet or an intranet, and may control the linear drive via a remote control. Alternatively, the movement pattern may be specified by a program, where the program may be based on principles of artificial intelligence.

By specifying the movement pattern, a simple and intuitive control of the linear drive is possible.

In a further advantageous embodiment of the method, a number of real axes is assigned to one virtual axis. This assignment, which is performed either in the control device and/or in the computer program product for ascertaining the movement pattern, allows the transition of a rotor from one segment to another segment to be described. Such an assignment particularly occurs with movement patterns across a number of segments. The real axes may be coupled.

Due to the assignment of a number of real axes to one virtual axis, it is possible to achieve a particularly low-vibration transition of the rotor from one segment to another segment.

The assignment may be effected dynamically, as required. This means that two real axes are assigned to one certain virtual axis at one point in time, and one or more other real axes are assigned at another point in time. The assignment of two real axes to one virtual axis is effected when a rotor transitions from one segment to another segment.

In a further advantageous embodiment of the method, virtual axes are coupled.

Coupling of the virtual axes is advantageously effected when the movements of the rotors are dependent on something. For example, a number of rotors can be moved later than one rotor. The coupling of virtual axes may map a coupling of the movement of several rotors of the linear drive. In this way, rotors may be moved grouped together. A grouped movement is, for example, understood to mean that a plurality of rotors perform a spaced-apart uniform movement. With this arrangement, a first rotor can specify the movement and the other rotors orient themselves on the movement of the first rotor.

Due to the coupling of virtual axes, interdependent movements in particular can be processed in the control device in a simple manner.

The control unit may comprise data connections to further control units. The control units may be directly connected to each other and indirectly communicate with each other via the control device. Advantageously the control units are connected via a fast network connection, in particular via a real-time-capable Ethernet.

Due to assigning one control unit to one segment, it is possible, in terms of the control, to extend an existing linear drive in a particularly simple manner. As a new segment is added, a new control unit can simply be connected to the control device. In this way, the linear drive can be easily extended in a cost-effective manner and/or adapted to an extended plant.

In a further advantageous embodiment of the method, the movement pattern is specified with the aid of an engineering system, in particular by a high-level language. Here, graphical programming languages are also advantageous as a high-level language. In addition, graphically based human-machine interfaces (e.g., virtual reality) are suitable. Commands especially adapted to the linear drive may be characteristic for the high-level language. For example, a command may describe a station, where the command may be executed with parameters and/or where it permits a reference to a movement profile.

Due to use of a high-level language, a movement pattern once specified may be modified in a simple manner, without it being necessary to incorporate it in a special command structure for specifying a movement pattern.

In a further advantageous embodiment of the method, the control unit comprises a current converter and/or an amplifier. The control unit serves as a power supply to the segment. A current converter is used to provide an electrical voltage or an electrical current with a specified frequency. In case the segment is constructed as a linear motor-stator, the control unit used may advantageously be a commercially used unit such as a SINAMIC by Siemens AG.

Alternatively, in a further advantageous embodiment of the method, the movement pattern may be specified, at least partially, by a machine station. With this configuration, the machine station specifies the movement pattern at least in the area of the linear drive, in which the rotors are within the range of influence of the machine station.

In a further advantageous embodiment, the rotors are transferred from a conveyor belt onto the segments and/or the rotors are received by a conveyor belt once they have passed through the machine stations.

As such, areas in which there is no need for an especially accurate positioning of the rotors, may be replaced by conveyor belts. This makes it possible to construct a particularly cost-effective linear drive.

A station is understood to mean an image of a machine station in the control device or the computer program product. A station is understood to mean, for example, an image of a production machine. In this embodiment, the station is in operative connection with the linear drive. For example, the machine station comprises an image of the linear drive. The specification of the movement pattern can then be integrated during programming of the station.

In a further advantageous embodiment of the method, the movement pattern of the rotor on the segment assigned to the machine station is specified by the machine station.

With the present embodiment, the linear drive can advantageously differentiate which segments are controlled or regulated by the machine station and which are controlled or regulated by the control device via the specified movement task. Segments are then assigned to the machine station, if the rotors in the machine station are located on the segments. These are, for example, the segments below a bottling apparatus or a placement apparatus of a bottling plant or packaging machine. The rotors of these segments are integrated in the operating cycle of the machine station. Therefore, the movement pattern for the rotors on the segments is advantageously specified by the machine station.

The assignment permits a simplified control of the linear drive by assigning entire segments to the machine station.

In one advantageous embodiment, the linear drive comprises a plurality of segments, where some of the segments are assigned to the machine station and where the machine station specifies the movement pattern, when one or more rotors are assigned to a range of influence of the machine station.

With the presently contemplated embodiment, the segments assigned to the machine station form the range of influence of the machine station.

In a further advantageous embodiment of the linear drive, the respective segment comprises both permanent magnets and coils for generating a magnetic field, where the magnetic field interacts with the rotor. This principle is also known as the Simplex technique. Advantageously, a rotor of a linear drive thus does not require its own permanent magnets.

The absence of permanent magnets means that the rotors take much longer to become soiled during operation of the linear transport because there is no magnetic force acting on magnetic particles, such as iron filings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be described and explained in detail with reference to figures. The individual features in the figures can be combined by the expert to form further embodiments without leaving the scope of the invention, in which.

DETAILED DESCRIPTION OF THE EXEMPLARY EMBODIMENTS

Figure 1:
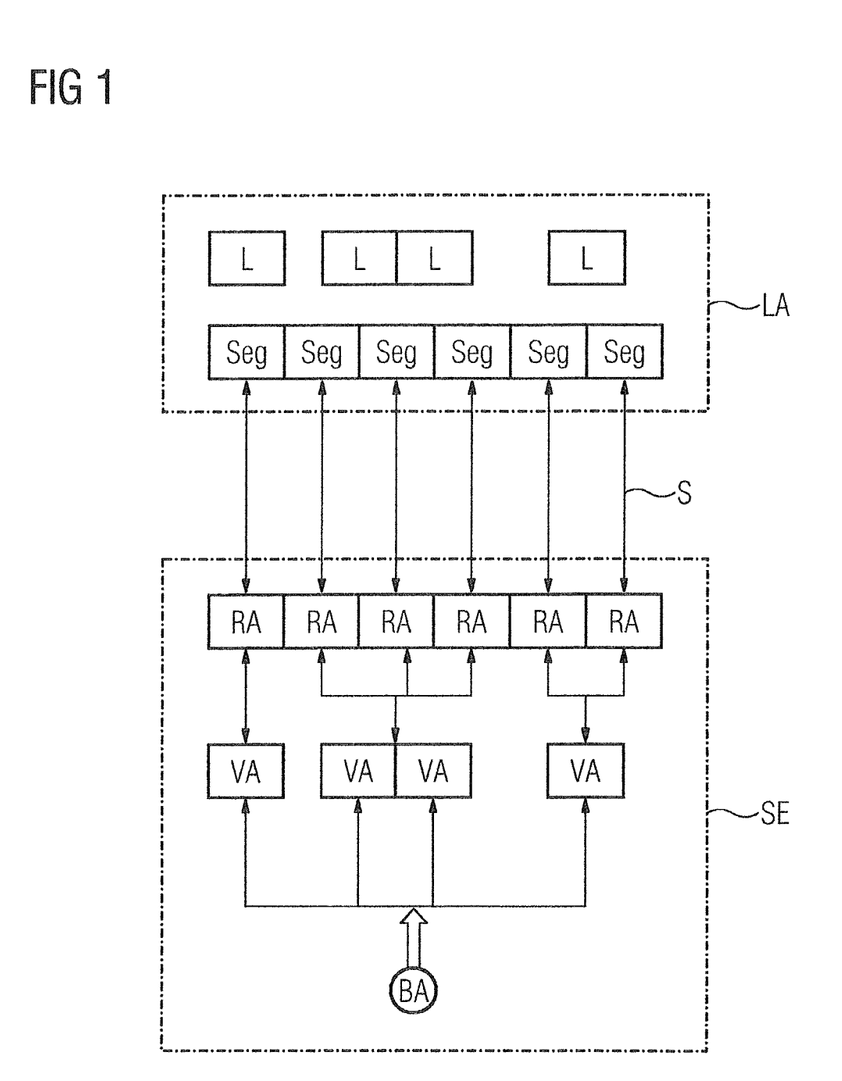
FIG. 1 shows a schematic structure of the linear drive in accordance with the invention.

FIG. 1 shows a schematic structure of the linear drive LA. The linear drive LA comprises a plurality of segments Seg, where rotors L are arranged on the segments Seg. Each segment Seg is controlled by a signal S. In this embodiment, the signal S is output by a control device SE. The signal S advantageously comprises the voltage supply/current supply of the segment Seg. The control device SE serves to control the movement of the rotors L on the segments Seg. The segments Seg are arranged adjacent to each other in a manner forming a stretch on which the rotors L are moved. The segments Seg are advantageously stators of linear motors, which are sequentially arranged next to each other.

The control device SE serves to transform a specified movement pattern BA into signals S for the segments Seg. The movement pattern BA is allocated in the control device SE among the virtual axes VA. A vertical axis VA corresponds to a movement of an assigned rotor L on the plurality of the segments. The movement of the rotor L is thus specified by a virtual axis VA. The virtual axis VA serves to specify the movement information to the real axes RA, where the real axes RA correspond to the movement of the rotors L on the individual segments Seg. Each segment Seg has a respective real axis RA assigned to it.

The allocation of the movement of the virtual axis VA among the real axes RA is effected according to the position of the rotor L at a point in time as well as optionally according to the intended position of the rotor L at a later point in time.

The control device SE may be designed by a computer program product, where the computer program product is installed on a computer unit and executed on the computer unit. Communication of the control device SE configured as a computer program product with the individual segments Seg is effected advantageously via a conventional interface, such as Ethernet, in particular a real-time-capable interface and/or another data-technical connection.

Driver stages controlled by the computer program product preferably serve as voltage supply/current supply to the segments Seg.

When a rotor L moves from one segment Seg to an adjacent segment Seg, the control device SE, for the period of transition of the rotor L, assigns to the virtual axis VA of the rotor those two real axes RA that are assigned to the participating segments. As the rotor L continues to move further on the segment Seg, the virtual axis VA is assigned that real axis RA upon which the rotor moves after the transition.

Figure 2:
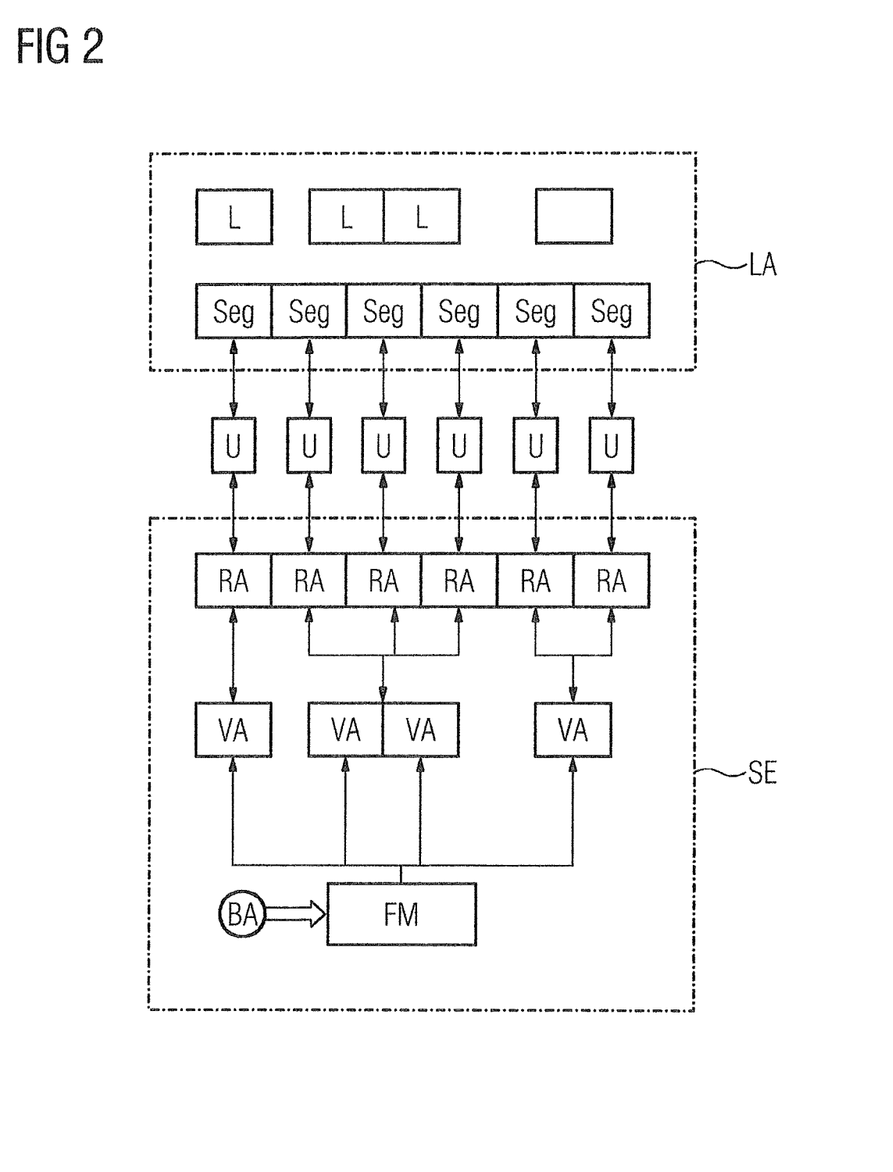
FIG. 2 shows a further embodiment of the linear drive in accordance with the invention.

FIG. 2 shows a further embodiment of the linear drive LA. Here, the linear drive LA also comprises a control device SE, a plurality of segments Seg, upon which a plurality of rotors L are moved. The control device SE is connected to a plurality of control units U. The connection between the control device SE and the control unit U is effected via a data-technical connection. The control device transmits signals S to the control units U. Each control unit U is also connected to a segment Seg. The control unit U serves to receive the movement information of the rotors on the assigned segment. The movement information corresponds to the specification of a real axis RA. The control unit U comprises either an amplifier or a current converter. The current converter provides an alternating current/an alternating voltage to the segment Seg. An amplifier provides a direct voltage to one or more coils of a segment Seg.

The control device SE comprises an input for a movement pattern BA. The movement pattern BA is, for example, specified by a user. Preferably the movement pattern BA is continuously re-ascertained/adapted. The movement pattern BA is transmitted to a function module FM. The function module FM separates the movement of the individual rotors L out of the movement pattern BA. The movement pattern of an individual rotor L is made available to a virtual axis VA. The virtual axis VA transfers the information of the movement pattern BA to the corresponding real axis RA. The virtual axis VA is assigned to the at least one real axis RA in accordance with the position of the rotor L on the segment Seg. The real axis RA is an image of the signal S for the control unit U assigned to the real axis RA. When a regulation of the movement of the at least one rotor L occurs, a determination of the position of the rotor L occurs. The position of the rotor L is advantageously transmitted back to the control device SE and/or the control unit U. The position of the rotor/the speed of it is ascertained by at least one sensor. The sensor can be assigned to a segment. The transmission of the position of the rotor L on the segments Seg back to the control unit U and/or the control device SE is symbolized by the signals S pointing in both directions.

Assignment of the virtual axes VA to the real axes RA is effected in an automated manner and without involving the user.

Figure 3:
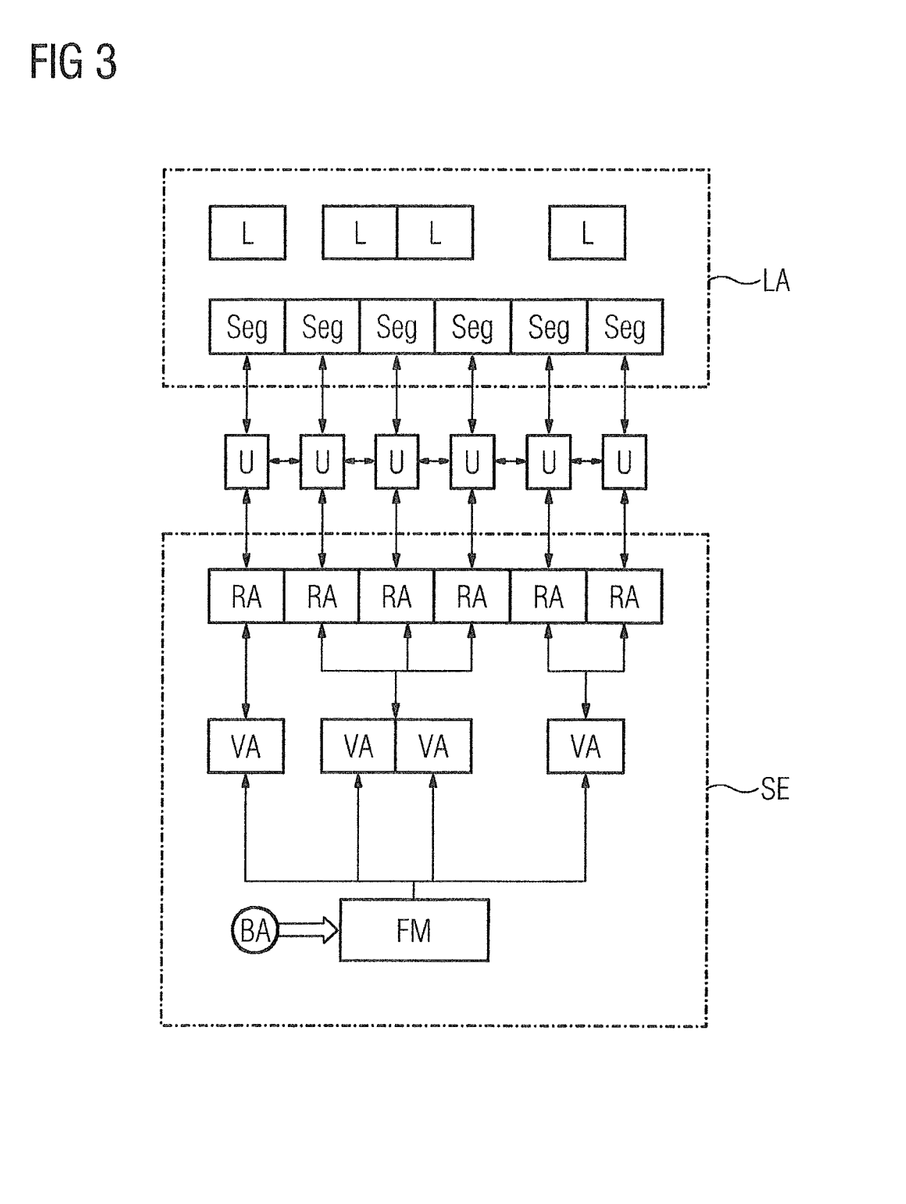
FIG. 3 shows a further embodiment of the linear drive in accordance with the invention.

FIG. 3 shows a further embodiment of the linear drive LA. The linear drive LA corresponds to the linear drive of FIG. 2, where as a further feature, the control units U communicate directly with one another. The communication of the control units U occurs via a data-technical connection. The data-technical connection is symbolized by double arrows between the control units U. Such a data connection may occur via preferably a real-time-capable network connection. The communication of the control unit U serves to reduce interferences during a rotor's L transition from a segment Seg to an adjacent segment Seg. Position data of the rotors on the segments Seg can be exchanged via the data connection.

Figure 4:
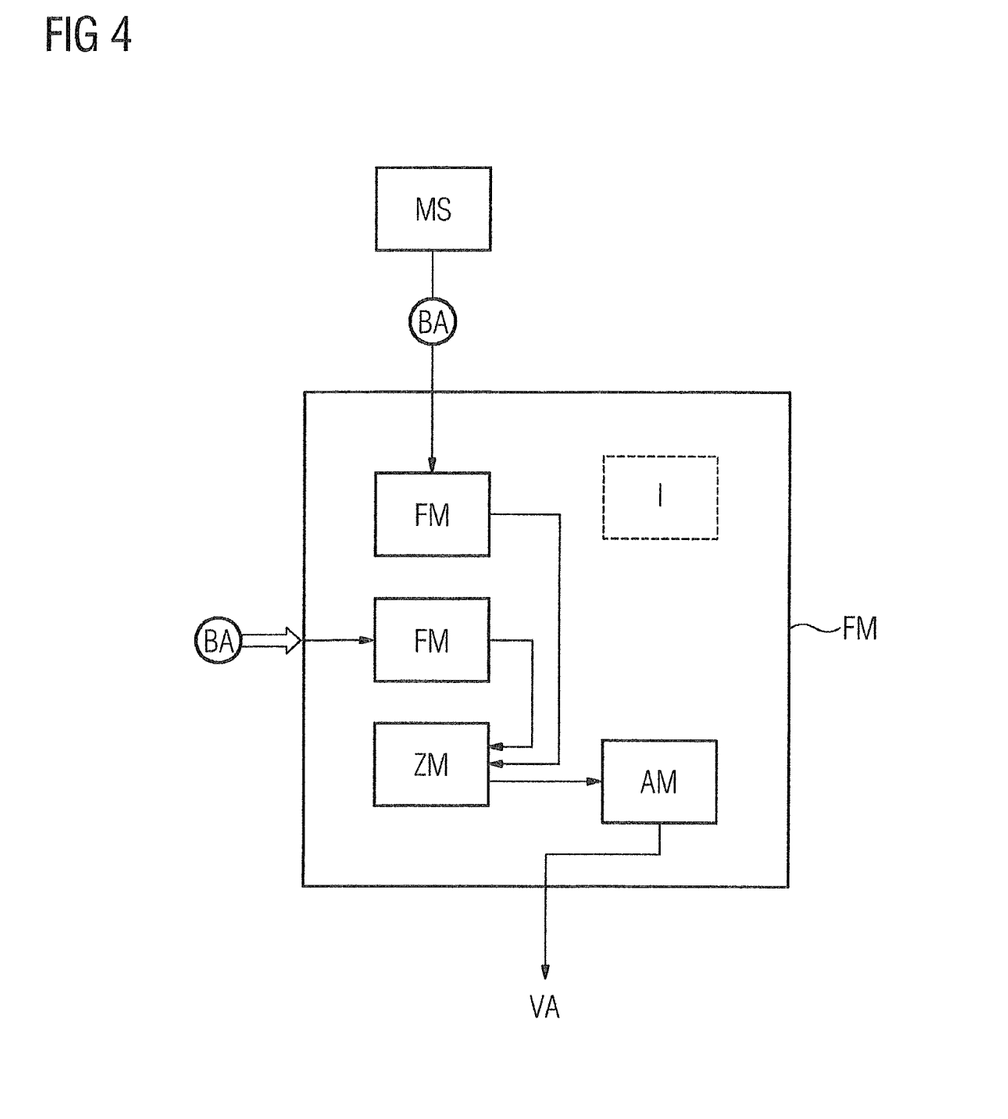
FIG. 4 shows a possible structure of a function module in accordance with the invention.

FIG. 4 shows the possible structure of a function module FM. The function module FM has inputs for a movement pattern from a machine station as well as an input for a movement pattern BA, which is specified by a user. The function module FM comprises at least one input module EM for the movement pattern of a machine station MS. Further, the function module FM comprises an input module EM for the movement pattern BA, which is specified by the user. The input modules EM are connected to an intermediate module ZM. The intermediate module ZM is used to determine who has sovereign power over the movement patterns of the rotors in the linear drive.

Sovereign power is meant to be understood as the priority of power during execution, i.e., whether the movement pattern BA specified by the user or a movement pattern BA specified by the machine station MS has priority during execution.

The intermediate module ZM transmits that movement pattern BA in which the sovereign power resides to an output module AM. The output module AM assigns the virtual axis VA to the corresponding movement pattern BA. The movement patterns BA for the corresponding virtual axis VA are provided by the function module FM to the virtual axes VA in the control device SE.

The correct data format of the movement patterns BA and/or the specifications for the virtual axis VA are determined by optional further elements, such as an interface I in the function module FM. The function module FM advantageously forms part of the control device SE, where the control device SE is provided for controlling the movement of the linear drive LA. The function module FM may also be formed by a part of the computer program product and may run (execute) on a computer unit.

Advantageously, the communication of the control device with the control units and/or the communication of the control units among each other occurs in Real-Time. Further, the network connections as well as the control device and/or the control units advantageously comprise a fail-safe option.

Figure 5:
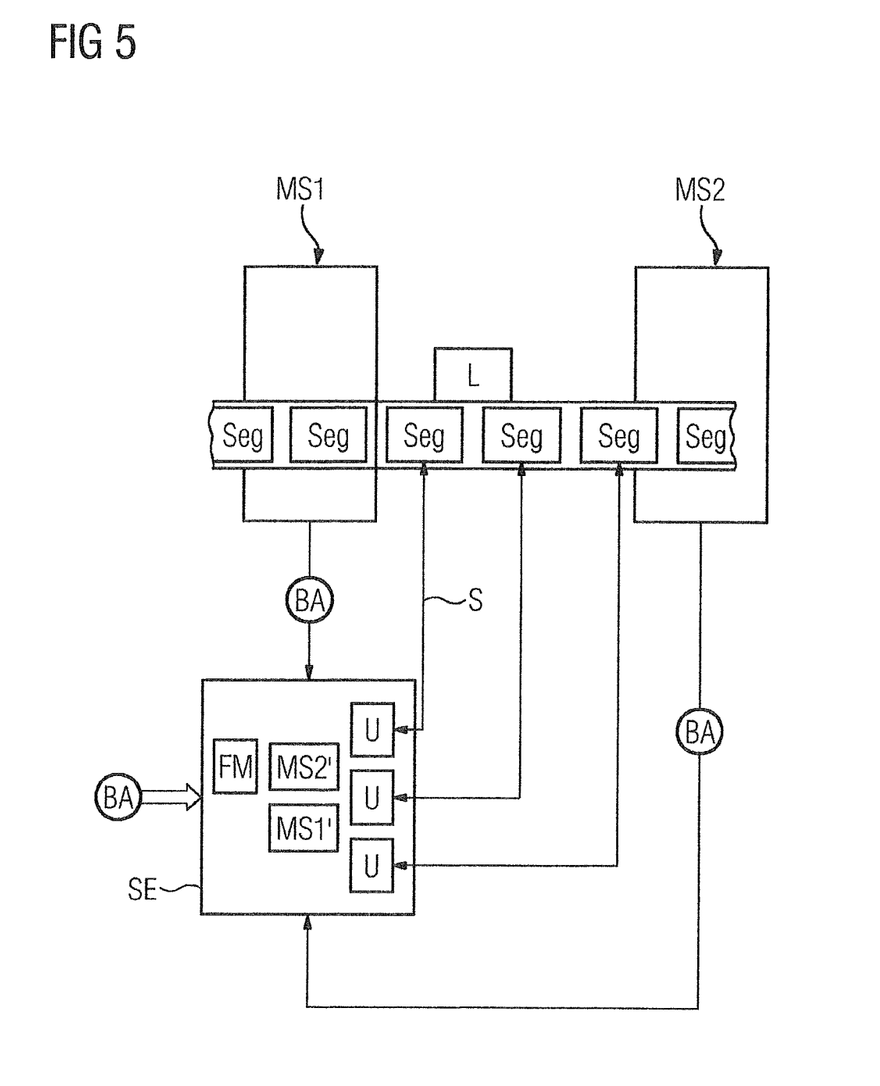
FIG. 5 shows two machine stations and a linear drive in accordance with the invention.

FIG. 5 shows two machine stations MS1, MS2 and a linear drive LA. The linear drive LA connects the first machine station MS1 and the second machine station MS2. The first machine station MS1 may be a bottling plant and the second machine station MS2 may be a packaging machine.

The rotor L is used to transport goods or workpieces WS between the machine stations MS1, MS2. The linear drive LA comprises segments Seg, a rotor L and a control device SE.

The control device SE serves to control or regulate the rotor L on the segments Seg. The movement pattern BA of the rotor L may be specified by the first machine station MS1, by the second machine station MS2 and/or by a user.

In case the rotor L is within a range of influence of one of the machine stations MS1, MS2, the corresponding machine station MS1, MS2 provides the movement pattern BA for the control device SE. The control device SE controls or regulates the movement of the rotor L on the segments Seg.

The range of influence of the machine station MS1, MS2 on the rotor is advantageously implemented by assigning segments Seg to the machine station MS1, MS2. As such, individual segments Seg can be assigned to a machine station MS1, MS2. The machine station MS1, MS2 specifies the movement pattern BA to the segments Seg, which are assigned to them.

Between the machine stations MS1, MS2, the rotors L may also be section-wise implemented by a conveyor belt instead of segments Seg. Both controlled movements, as well as regulated movements of the rotors L, can be performed on individual segments Seg. Regulation is advantageously effected by a sensor for determining the position of the rotor L on the regulated segment Seg. The control variable used in the regulated range is advantageously the position of the rotor L or the speed of the rotor L.

The machine station MS1, MS2 advantageously comprises images of the machine station MS1', MS2' in the control device SE. Here, the control device SE is preferably implemented as a computer program product. The computer program product comprises the images of the machine stations MS1', MS2' as building blocks of the computer program product. When generating the signals S for the control units U and/or the segments Seg, a function module FM serves to select the movement pattern BA. Either an image of the machine station MS1', MS2' or the user specifies the movement pattern BA for a segment. Selection of the movement pattern BA is advantageously made by the control device SE or the computer program product.

In conclusion, the disclosed embodiments of the invention relate to a method for the control of a movement of at least one rotor L with a linear drive LA, a control device SE, a linear drive LA, a production or packaging machine, as well as a computer program product. In specifying the movement, a user or a machine station specifies the movement pattern BA to the control device SE. The specified movement pattern BA is assigned to virtual axes VA, particularly with the aid of the computer program product. The distribution of a movement pattern among virtual axes VA is advantageously automatic. In a further step, the virtual axes VA are assigned to real axes RA. A control unit U, in particular a converter, controls the movement of the rotor L on the segment (Seg) of the linear drive LA. The control unit U supplies at least one segment Seg with electrical voltage or current. The segments Seg as part of the linear drive LA thus move the rotors L via the specifications of the movement pattern BA. Advantageously, such an assignment is effected in an automated manner thus relieving the user when specifying the movement pattern BA.

Figure 6:
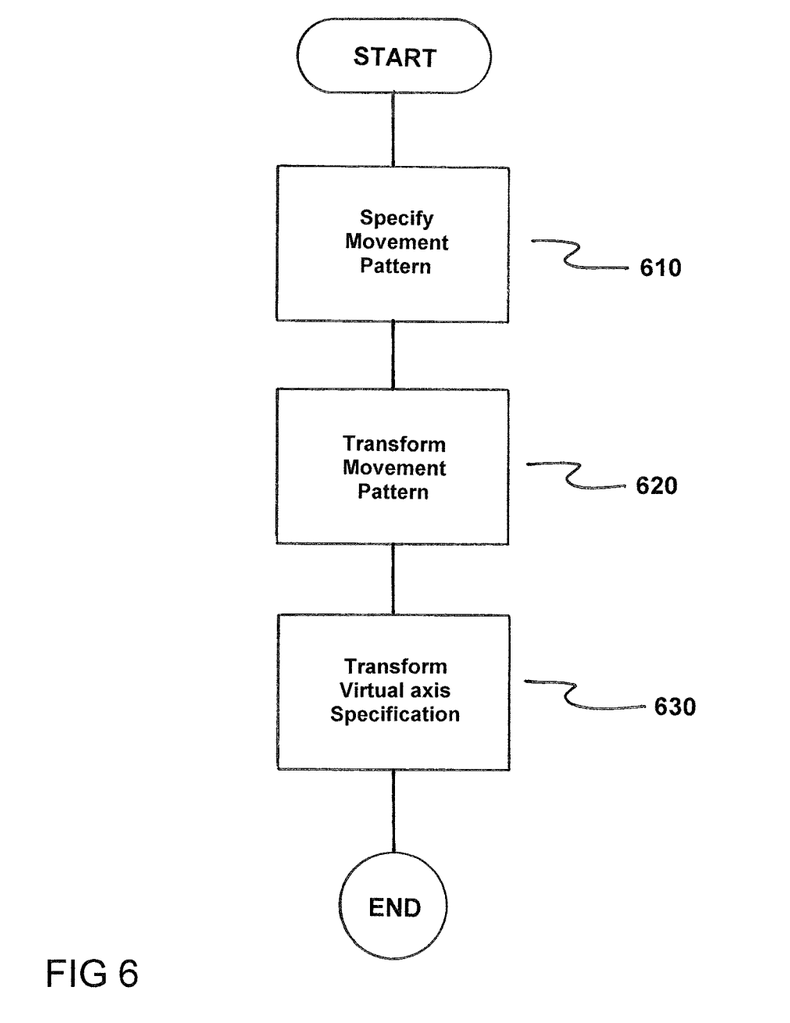
FIG. 6 is a flowchart of the method in accordance with the invention.

FIG. 6 is a flowchart of the method for controlling the movement of at least one rotor L of a linear drive LA including at least one segment Seg and the rotor L. The method comprises specifying a movement pattern BA for the at least one rotor L, as indicated in step 610.

Next, the movement pattern BA of the at least one rotor L is transformed into a specification for a virtual axis VA, as indicated in step 620.

Next, the specification of the virtual axis VA is transformed into a specification for a real axis RA or into a specification for a plurality of real axes RA, as indicated in step 630. In accordance with the invention, the specification is provided for the at least one real axis RA of a control unit U which utilizes the specification to control the movement of the at least one rotor L on the segment Seg.

Figure 7:
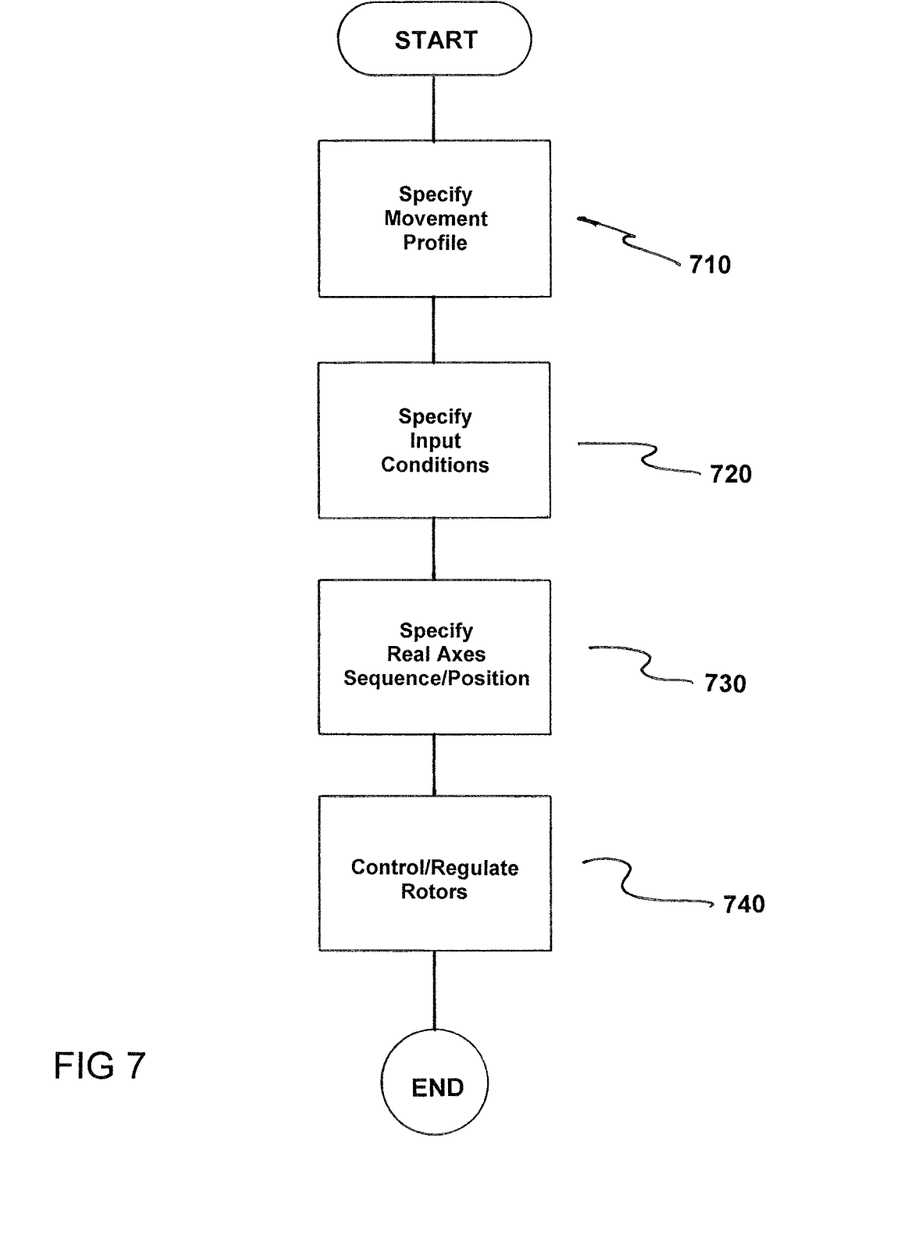
FIG. 7 is a flowchart of the method of the invention in accordance with an embodiment.

FIG. 7 is flowchart of the method for controlling and/or regulating a movement of rotors L in a linear drive LA that is configured for the transportation of goods or products in a machine station MS1, MS2 or from one machine station MS1 to another machine station MS2, in which segments Seg are provided for moving the rotors L, where a control device SE is configured to control and/or regulate the movement of the rotors L on the segments Seg, the linear drive within the control device is configured via assignments in which a respective machine station MS1, MS2 is assigned a respective station S1, S2, a respective rotor L is assigned a virtual axis VA, and where a respective segment Seg is assigned a real axis RA. The method comprises specifying a movement profile BP for the respective station S1, S2, as indicated in step 710.

Next, input conditions comprising an intended number N of virtual axes VA are specified for the respective station S1, S2, as indicated in step 720.

Next, a sequence/position of the real axes RA is specified, as indicated in step 730.

Next, control or regulation of the rotors L of the linear drive LA is performed, as indicated in step 740. Here, the segments Seg are controlled/regulated based on the specification of the real axes RA, where the real axes RA are ascertained from a respective virtual axis VA ascertained from the respective movement profile BP of the station S1, S2 and/or a sequence of passed-through stations S1, S2. In accordance with the invention, the sequence of stations S1, S2 may have been specified for a rotor L, and/or the sequence of stations S1, S2 results such that the virtual axis VA is assigned to a station S1, S2 when a station S1, S2 is ready for receiving the intended number N of virtual axes VA and the intended number N of virtual axes VA for the station S1, S2 is available. Moreover, the virtual axes VA are assigned in accordance with a specified sequence, respectively one after the other, to the specified stations S1, S2.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for controlling a movement of at least one rotor of a linear drive comprising at least one segment and the rotor, the method comprising:

specifying a movement pattern across a plurality of segments for a plurality of rotors;

transforming the movement pattern of the plurality of rotors across the plurality of segments into a respective specification for a respective virtual axis which maps the movement of a respective rotor of the plurality of rotors across the plurality of segments; and transforming the respective specification of the respective virtual axis into a respective specification for a respective real axis of a plurality of real axes, the specification being provided for the respective real axis of a control unit which utilizes the respective specification to control the movement of the respective rotor on a respective segment of the plurality of segments.

2. The method as claimed in claim 1, wherein each respective virtual axis maps the movement of at least one rotor on one segment or on the plurality of segments for the plurality of rotors.

3. The method as claimed in claim 1, wherein the movement pattern is specified by a user.

4. The method as claimed in claim 1, wherein the respective real axis of the plurality of real axes are assigned to the respective virtual axis.

5. The method as claimed in claim 1, wherein at least two respective axes of a plurality of virtual axes are coupled.

6. The method as claimed in claim 1, wherein the respective real axis is assigned to a respective control unit and the control unit controls the respective segment.

7. The method as claimed in claim 1, wherein the control unit comprises at least one of (i) a converter and (ii) an amplifier; and wherein the control unit supplies power to the at least one to the respective segment of the plurality of segments.

8. The method as claimed in claim 1, wherein the respective rotor of the plurality of rotors is transferred onto the respective segment of the plurality of segments and at least one of (i) a conveyor belt and (ii) the respective rotor of the plurality of rotors, after passing through machine stations, are received by a conveyor belt.

9. The method as claimed in claim 1, wherein the movement pattern of the at least one rotor on a segment assigned to a machine station is specified by the machine station.

10. The method as claimed in claim 1, wherein the linear drive comprises a plurality of segments; wherein some of the plurality of segments are assigned to a machine station; and wherein the machine station specifies the movement pattern when the respective rotor of the plurality of rotors is assigned to a range of influence of the machine station.

11. The method as claimed in claim 1, wherein an engineering system aids in specifying the movement pattern.

12. The method as claimed in claim 11, wherein the engineering system comprises a high-level language.

13. A control device for a linear drive, comprising:
an input for a movement pattern of a rotor of the linear drive; and
at least one output for a signal for at least one control unit;
wherein the control device is configured to:
specify a movement pattern across a plurality of segments for a plurality of rotors;
transform the movement pattern of the plurality of rotors across the plurality of segments into a respective specification for a respective virtual axis which maps the movement of a respective rotor of the plurality of rotors across the plurality of segments; and
transform the respective specification of the respective virtual axis into a respective specification for a respective real axis of a plurality of real axes, the specification being provided for the respective real axis of a control unit which utilizes the respective specification to control the movement of the respective rotor on a respective segment of the plurality of segments.

14. A linear drive comprising:
at least one segment;
a rotor which executes a specified movement on the at least one segment;
at least one control unit;
a control device connected to the at least one control unit and including an input for a movement pattern of the rotor of the linear drive, and at least one output for a signal for the at least one control unit; and
wherein a respective segment is connected to a respective control unit;
wherein the control device is configured to provide signals to the respective control unit for controlling the rotor on the respective segment;
wherein the respective segment is optionally assigned to a machine station; and
wherein the control device is configured to:
specify a movement pattern across a plurality of segments for a plurality of rotors;
transform the movement pattern of the plurality of rotors across the plurality of segments into a respective specification for a respective virtual axis which maps the movement of a respective rotor of the plurality of rotors across the plurality of segments; and
transform the respective specification of the respective virtual axis into a respective specification for a respective real axis of a plurality of real axes, the specification being provided for the respective real axis of a control unit which utilizes the respective specification to control the movement of the respective rotor on a respective segment of the plurality of segments.

15. The linear drive as claimed in claim 14, wherein the respective segment comprises permanent magnets and coils for generating a magnetic field which interacts with the rotor.

16. A production machine, machine tool or packaging machine, comprising:
a machine station connected to the linear drive of claim 14.

17. A production machine, machine tool or packaging machine, comprising:
a machine station connected to the linear drive of claim 15.

* * * * *